US008745856B2

(12) United States Patent
Linhart et al.

(10) Patent No.: US 8,745,856 B2
(45) Date of Patent: Jun. 10, 2014

(54) METHOD FOR PRODUCING A CERAMIC FILTER ELEMENT

(75) Inventors: Jochen Linhart, Schwaikheim (DE);
Sabine Otterbach,
Bietigheim-Bissingen (DE); Kathrin Lichtenwalter, Nuremberg (DE);
Michael Micke, Singapore (SG); Karin Gerlach, Eningen u.A. (DE)

(73) Assignee: Mann + Hummel GmbH, Ludwigsburg (DE)

( * ) Notice: Subject to any disclaimer, the term of this patent is extended or adjusted under 35 U.S.C. 154(b) by 204 days.

(21) Appl. No.: 13/204,972

(22) Filed: Aug. 8, 2011

(65) Prior Publication Data
US 2011/0289895 A1    Dec. 1, 2011

Related U.S. Application Data

(63) Continuation of application No. PCT/EP2010/051635, filed on Feb. 10, 2010, and a continuation-in-part of application No. 13/033,979, filed on Feb. 24, 2011, now Pat. No. 8,557,009, and a continuation-in-part of application No. 11/651,544, filed on Jan. 10, 2007, now Pat. No. 7,913,377.

(30) Foreign Application Priority Data

Jul. 10, 2004   (DE) .................. 10 2004 033 494
Feb. 10, 2009   (DE) .................. 10 2009 008 297

(51) Int. Cl.
*H05B 3/00*        (2006.01)

(52) U.S. Cl.
USPC .............. 29/611; 29/428; 29/455.1; 29/530; 29/890; 29/896.6; 422/179; 422/180

(58) Field of Classification Search
USPC ........ 29/611, 428, 455.1, 525.04, 527.3, 530, 29/890, 896.6, 896.62; 422/179, 180; 502/439, 527.19, 527.21, 527.22
See application file for complete search history.

(56) References Cited

U.S. PATENT DOCUMENTS

| 4,619,912 | A | * | 10/1986 | Jalbing et al. ................. 502/439 |
| 5,008,086 | A | * | 4/1991 | Merry ........................... 422/180 |
| 5,145,539 | A | | 9/1992 | Horikawa et al. |
| 7,913,377 | B2 | | 3/2011 | Gerlach et al. |
| 2007/0186911 | A1 | | 8/2007 | Gerlach et al. |
| 2008/0141638 | A1 | | 6/2008 | Linhart et al. |

FOREIGN PATENT DOCUMENTS

| DE | 12006041188 A1 | 3/2008 |
| EP | 036591 A2 | 3/1990 |
| WO | WO2006005668 A1 | 1/2006 |

OTHER PUBLICATIONS

PCT International search report of PCT/EP2010/051635.

* cited by examiner

*Primary Examiner* — Thiem Phan
(74) *Attorney, Agent, or Firm* — James Hasselbeck

(57) ABSTRACT

A ceramic filter element of ceramic material has an exterior surface that is provided with structural elements. The structural elements are produced by a non-cutting method. The structural elements are molded in the ceramic material in the form of grids, periodic patterns, irregular patterns, lettering or labels.

4 Claims, 2 Drawing Sheets

US 8,745,856 B2

METHOD FOR PRODUCING A CERAMIC FILTER ELEMENT

CROSS REFERENCE TO RELATED APPLICATIONS

The present application is a bypass continuation application of currently pending international application No. PCT/EP2010/051635 having an international filing date of Feb. 10, 2010 and designating the United States, the international application claiming a priority date of Feb. 10, 2009, based upon prior filed German patent application No. 10 2009 008 297.2, the entire contents of the aforesaid international application and the aforesaid German patent application being incorporated herein by reference.

The present application is a continuation in part (CIP) of and claims priority to currently pending U.S. patent application Ser. No. 13/033,979 filed Feb. 24, 2011, the entire contents of U.S. patent application Ser. No. 13/033,979 incorporated herein by reference. U.S. patent application Ser. No. 13/033,979 is a continuation in part (CIP) of U.S. patent application Ser. No. 11/651,544 (now U.S. Pat. No. 7,913,377) which is a continuation of international patent application no. PCT/EP2005/052884, filed Jun. 21, 2005, designating the United States of America, and published in German on Jan. 19, 2006 as WO 2006/005668 which claims priority from German patent application no. 102004033494.3, filed Jul. 10, 2004. U.S. patent application Ser. No. 13/033,979 further claims priority from U.S. patent application Ser. No. 11/945,371 filed Nov. 27, 2007 which claims priority from Federal Republic of Germany patent application no. 102006056196.1, filed Nov. 27, 2006.

TECHNICAL FIELD

The invention relates to ceramic filter elements of an exhaust gas filter of an internal combustion engine. In particular, the invention concerns ceramic honeycomb-shaped diesel particulate filters.

BACKGROUND OF THE INVENTION

Filters Modern diesel engines emit a substantially smaller quantity of soot particles in comparison to older diesel engines. In this connection, diesel particulate filters lower the particulate emission significantly by providing means to retain even the finest particles that are produced in the combustion process of diesel fuel.

Known are diesel particulate filters (DPFs) made from extruded ceramic material; also DPFs on the basis of wound elements are known. For example, WO 2006/005668 discloses a method for producing a ceramic filter element of an exhaust gas filter for internal combustion engines. In this connection, first a combustible non-ceramic support web is impregnated with a ceramic slip or slurry and, subsequently, after having been formed to the desired geometric shape, is fired to such an extent that the support web is combusted and a rigid filter body remains. Such porous ceramic components can be used, for example, as catalyst supports or for filtration applications, primarily in high temperature applications.

These diesel particulate filters of the prior art have inter alia the disadvantage that when being mounted in a housing, the so-called canning process, they cause problems because, as a result of their smooth surface, there is no proper grip or engagement of the ceramic mat used for installation between the DPF and the sheet metal housing. Therefore, the filters of the prior art require a stronger compression of the ceramic mat.

There is therefore the need to provide a ceramic filter element, in particular a diesel particulate filter, that avoids these disadvantages of the prior art.

SUMMARY OF THE INVENTION

The invention is concerned in particular with the manufacture of ceramic filter elements as diesel particulate filters and particle filters for internal combustion engines as well as ceramic carriers for catalyst supports.

In the method preferred according to the present invention, a non-ceramic medium, for example, paper, in particular paper comprising cellulose, is first brought into shape, for example, shaped to a wound body, where the shaped body is generally shaped to the shape of the desired ceramic filter element body to be manufactured. The wound body can comprise a wound flat and corrugated layers of the non-ceramic or paper medium. The wound medium in the wound shaped body is then impregnated with a ceramic material, for example, a ceramic slip or slurry. The impregnated shaped body is then fired or sintered. During sintering the organic components, for example, of the paper comprising e.g. cellulose fibers, can be removed from the wound body or converted by combustion. This non-extruded method of manufacturing a ceramic filter element is in contrast to the prior art extrusion processes producing the extruded ceramic filter elements of the prior art.

It is therefore an object of the present invention to provide a ceramic filter element, in particular a diesel particulate filter, for installation in an exhaust gas filter of an internal combustion engine that provides a better grip of the filter in the housing.

It is a further object of the present invention to provide such a diesel particulate filter that ensures correct or proper installation or assembly.

This and further objects are solved by the ceramic filter element, in particular particle filter, for example, diesel particulate filter, or catalyst support for installation in an exhaust gas filter of an internal combustion engine that is characterized in that the external surface (wall surface) of the ceramic filter element is provided with structural elements.

The structural elements are produced by a non-cutting method.

The structural elements are molded in the ceramic material in the form of grids, periodic patterns, irregular patterns, lettering or labels.

The invention concerns a method for producing a ceramic filter element, comprising the step of applying structural elements to the exterior surface of the ceramic filter element during production of the ceramic filter element. The method comprises the steps of:

producing a wound filter of one or several layers of a paper-like material;
introducing the wound filter into a carrier that provides a negative mold pattern of the structural elements to be formed so that on the exterior of the wound filter the structural elements to be formed are predefined;
impregnating the wound filter with a ceramic slip so that the ceramic slip is displaced by the negative mold pattern of the carrier;
removing the carrier;
sintering the impregnated wound filter.

The paper-like material is preferably filter paper.

The present state of the art does not provide diesel particulate filters that already, during generation of the ceramic material (ceramic body), are provided with a structured external surface. Prior art and known diesel particulate filters are extruded as a single-part or multi-part component. An external contour must then still be worked in by mechanical processing of the ceramic segments. Moreover, an additional thin ceramic layer is applied in order to close off the passages that are now open toward the exterior and in order to compensate tolerances.

The extrusion process itself is not capable of imparting any desired structure e.g. recesses and/or raised portions on the exterior side of the diesel particulate filter.

According to the invention on the exterior side (wall surface) of a diesel particulate filter different structures or patterns are advantageously applied. These structures or structural elements can be, for example, raised portions and/or recesses (depressions) that can have different functions. The structures can be either applied to the entire surface area or only across partial areas of the exterior side.

Particularly simple and advantageous is the generation of such structures or structural elements by the so-called infiltration process because the structures, by use of a template or a tool (mold) during the process, can be molded or shaped in a simple way without additional expenditure. Such structures can also be advantageous in connection with conventional extruded diesel particulate filters. The application of these structures can be performed to a certain degree also during application of the aforementioned additional thin ceramic layer. This can be done by templates/molds (tools) or also by material removal, i.e., scraping/scoring or grinding.

By structuring the exterior side of the ceramic diesel particulate filter the canning process can be facilitated because the rough structured surface provides for a better grip or engagement of the ceramic mat between particulate filter and sheet metal housing. In this way, a reduced compression of the ceramic mat is required.

When structuring is applied, for example, in the form of arrows, i.e., as a shaped directional indicator, a simple and unequivocal indication of the insertion direction of the filter element is possible.

By generating functional elements, for example, in the form of pins, a collar, or the like, proper mounting of the filter element into a housing or receptacle can be ensured.

Moreover, for example, identifying lettering, a company logo etc. can be applied as an indication of origin or protection against product piracy.

According to at least one aspect of the invention, a filter element includes an axially wound layered filter body of combustible paper-like material, wherein each wound layer may includes one or more layers of the paper-like material. The wound layered filter body forms a template or support structure into and onto which the ceramic slip is impregnated. The fully wound layered filter body of paper like material is preferably impregnated in it's fully wound shape with the ceramic slip material. Advantageously, at least one of the wound layers may include a corrugated paper-like layer which forms axial channels extending between opposing ends of the would layered filter body. The ceramic slip advantageously may enters the channels during ceramic impregnation to impregnate the interior of the wound layered filter body. During impregnation or afterwards, structural elements are formed on the exterior surface of the now ceramic impregnated filter body before the ceramic material hardens. The structural elements are produced on the exterior surface by a non-cutting method. The ceramic impregnation and structural elements remain on the filter element after the combustible paper-like material is removed by combustion, such as by sintering, thereby providing a porous, gas permeable, rigid ceramic filter element having axial gas flow channels extending between opposing axial ends of the filter element.

The invention will be explained in more detail the following with the aid of embodiments and with reference to the attached drawings.

BRIEF DESCRIPTION OF THE DRAWINGS

The accompanying Figures are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
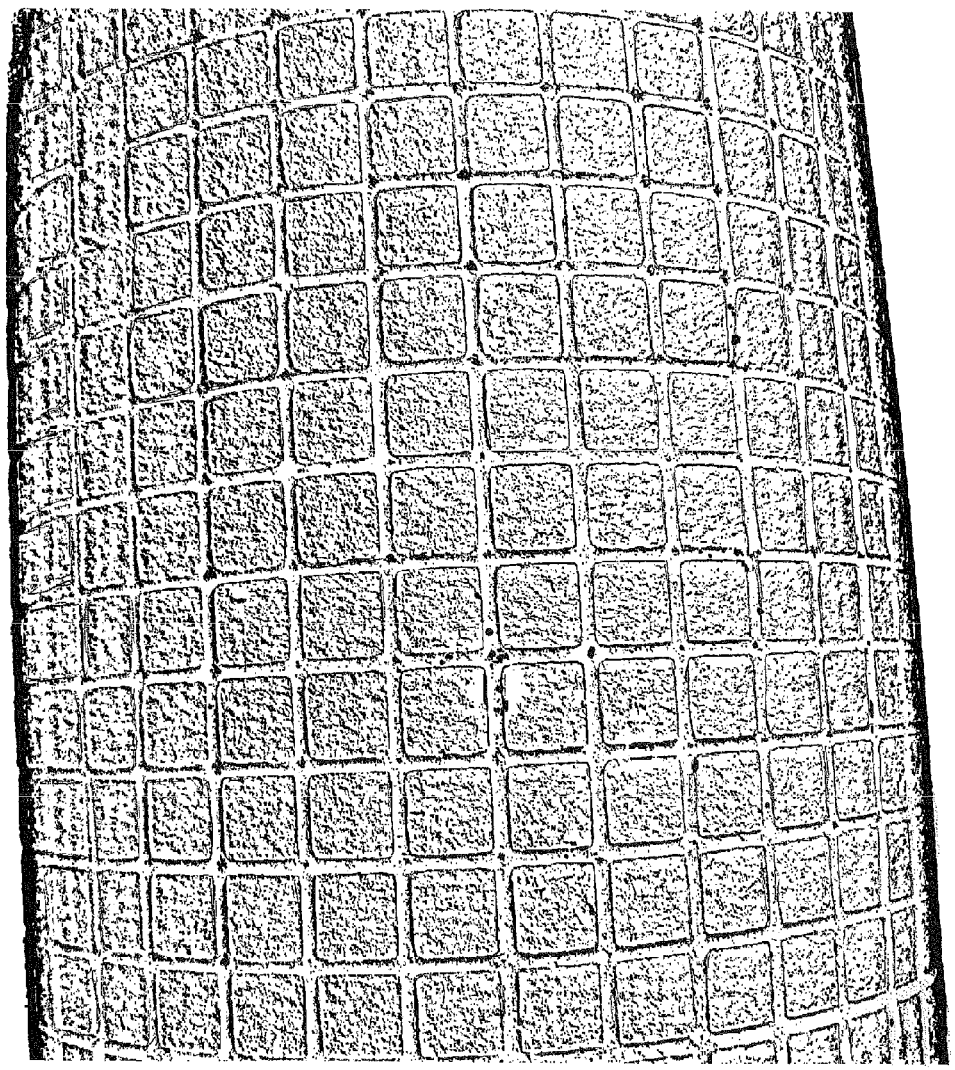
FIG. 1 depicts a ceramic filter element with structural elements on the exterior surface, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components and method steps related to ceramic filter element with provided with structural elements and disclosed herein and the production methods for such filter elements. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 depicts a rectangular grid structure on the exterior side of a ceramic filter element according to the invention. With such a grid structure, the canning process can be facilitated.

Figure 2:
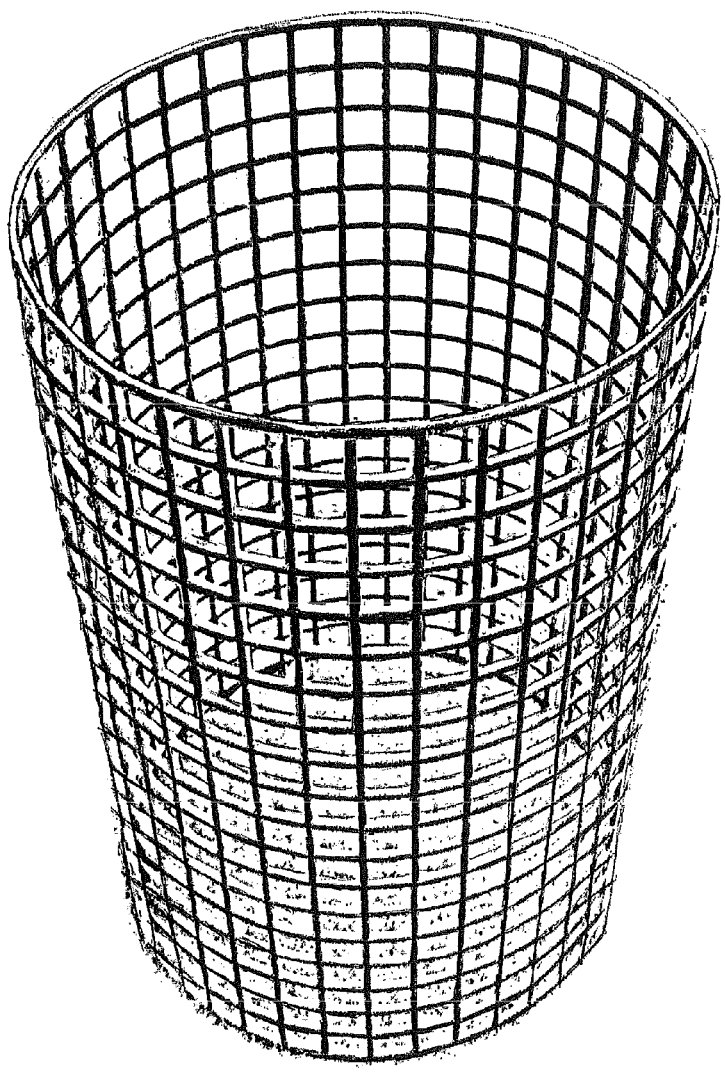
FIG. 2 depicts a carrier or support that provides a negative die or mold for the structural elements of the filter element, consistent with the present invention.

A wound filter (preferably of paper filter media) was introduced into a support tube according to FIG. 2 and then impregnated with ceramic slip or slurry. At the locations where the support was resting on the wound filter, the ceramic slip was displaced. In the openings provided in the support or carrier, on the other hand, a large quantity of ceramic slip was deposited resulting in a raised external structure or structural elements molded or formed onto the wound filter element. This external structure is configured, i.e., is "raised", such that, even when applying an external layer, for example, by applying a coating, the structure or structural elements remain intact. Such a structure can be used also for the purpose of lettering or labeling.

Since the structure is produced by a molding process, no further processing of the filter element by material removal (cutting) is required.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method for producing a ceramic filter element, comprising the steps of:
    applying structural elements onto an exterior surface of the ceramic filter element during generation of a ceramic body of the ceramic filter element by the steps of:
        providing a combustible non-ceramic paper-like material sheet material;
        rolling or winding together one or several layers of the combustible paper-like material to form a wound filter;
        introducing the wound filter into a carrier that provides a negative mold pattern of the structural elements to be formed so that on an exterior of the wound filter the structural elements to be formed are defined;
        impregnating the wound filter with a ceramic slip so that the ceramic slip is displaced by the negative mold pattern of the carrier;
        removing the carrier from the wound filter;
        sintering the impregnated wound filter, removing the paper-like material by combustion and forming a rigid sintered ceramic filter element having the structural elements thereon.

2. The method according to claim 1, wherein the paper-like material is filter paper.

3. The method according to claim 1, wherein
    in the step of apply structural elements, the structural elements are formed into the wound filter in the form of grids, periodic patterns, irregular patterns, lettering or labels.

4. The method according to claim 1, wherein
    the rigid ceramic filter element is in the form of a catalyst support.

* * * * *